(12) United States Patent
Rahman (10) Patent No.: US 9,419,442 B2
(45) Date of Patent: Aug. 16, 2016

(54) RENEWABLE ENERGY POWER DISTRIBUTION SYSTEM

(71) Applicant: Khaliqur Rahman, Torrance, CA (US)

(72) Inventor: Khaliqur Rahman, Torrance, CA (US)

(73) Assignee: KR Design House, Inc., Torrance, CA (US)

( * ) Notice: Subject to any disclaimer, the term of this patent is extended or adjusted under 35 U.S.C. 154(b) by 457 days.

(21) Appl. No.: 13/966,590

(22) Filed: Aug. 14, 2013

(65) Prior Publication Data

US 2014/0049117 A1    Feb. 20, 2014

Related U.S. Application Data

(60) Provisional application No. 61/683,189, filed on Aug. 14, 2012.

(51) Int. Cl.
*H02J 4/00* (2006.01)
*H02J 3/46* (2006.01)
(Continued)

(52) U.S. Cl.
CPC . *H02J 4/00* (2013.01); *H02J 1/102* (2013.01); *H02J 3/382* (2013.01); *H02J 3/46* (2013.01); *H02J 13/0006* (2013.01); *H02J 3/383* (2013.01); *H02J 3/386* (2013.01); *Y02E 10/563* (2013.01); *Y02E 10/763* (2013.01); *Y02E 40/72* (2013.01);
(Continued)

(58) Field of Classification Search
CPC ............. H02J 4/00; H02J 1/102; H02J 3/382; H02J 3/46; H02J 13/0006; H02J 3/383; H02J 3/386; Y10T 307/707; Y02E 10/563; Y02E 10/763

USPC .......................................................... 307/82
See application file for complete search history.

(56) References Cited

U.S. PATENT DOCUMENTS 6,433,444 B1    8/2002    Vries
6,433,522 B1    8/2002    Siri
(Continued)

FOREIGN PATENT DOCUMENTS

AU    2010-202632    1/2011
CA    2708001        1/2011
(Continued)

OTHER PUBLICATIONS

PCT International Search Report, Nov. 26, 2014.
(Continued)

*Primary Examiner* — Hal Kaplan
(74) *Attorney, Agent, or Firm* — Hankin Patent Law, APC; Jimmy Sauz; Kevin Schraven (57) ABSTRACT

A power distribution system. The power distribution system may comprise a plurality of renewable energy sources and plurality of converters to increase fault tolerance in the event of a component failure and to minimize output power degradation. Each converter may be comprised of a plurality of input ports, wherein each input port receives controlled amount of energy from the plurality of renewable energy sources. Each input port may also be disconnected in the event of component or device failure. Each of the converters is preferably configured to have additional power capacity to offset any reduced output capacity by a faulty converter, and preferably, the performance of each converter is monitored by the system to maintain its performance. The power distribution system may be monitored by a third party to maintain the energy output levels and to facilitate the power distribution system's restoration to normal functioning.

8 Claims, 8 Drawing Sheets

(51) Int. Cl.
*H02J 1/10* (2006.01)
*H02J 3/38* (2006.01)
*H02J 13/00* (2006.01)

(52) U.S. Cl.
CPC ................ *Y02P 80/21* (2015.11); *Y04S 10/123* (2013.01); *Y10T 307/707* (2015.04)

(56) References Cited

U.S. PATENT DOCUMENTS

| | | | |
|---|---|---|---|
| 6,737,757 B1 | 5/2004 | Stiesdal | |
| 7,359,223 B2 | 4/2008 | Chen et al. | |
| 8,049,523 B2 | 11/2011 | Gazit | |
| 8,138,631 B2 | 3/2012 | Allen et al. | |
| 8,264,195 B2 | 9/2012 | Takehara et al. | |
| 8,289,183 B1 | 10/2012 | Foss | |
| 8,289,742 B2 | 10/2012 | Adest | |
| 8,384,243 B2 | 2/2013 | Adest | |
| 8,401,706 B2 | 3/2013 | Moore et al. | |
| 8,423,308 B2 | 4/2013 | Lewis et al. | |
| 8,531,055 B2 * | 9/2013 | Adest | 307/43 |
| 8,633,670 B2 | 1/2014 | Choi | |
| 8,686,592 B2 | 4/2014 | Fontana et al. | |
| 2004/0246753 A1 * | 12/2004 | Kunow | H02M 3/285 363/65 |
| 2009/0145480 A1 | 6/2009 | Adest | |
| 2011/0006600 A1 | 1/2011 | Fontana et al. | |
| 2011/0133461 A1 | 6/2011 | Hjort | |
| 2011/0140649 A1 | 6/2011 | Choi | |
| 2011/0148194 A1 | 6/2011 | Lai et al. | |
| 2011/0187117 A1 | 8/2011 | Hess et al. | |
| 2011/0220182 A1 | 9/2011 | Lin et al. | |
| 2012/0146423 A1 | 6/2012 | Bodewes et al. | |
| 2012/0324119 A1 | 12/2012 | Imes et al. | |
| 2013/0026839 A1 | 1/2013 | Grana | |
| 2013/0131884 A1 | 5/2013 | Jain | |

FOREIGN PATENT DOCUMENTS

| | | |
|---|---|---|
| CN | 102104263 | 6/2011 |
| EP | 0039710 | 11/1981 |
| EP | 1416604 | 5/2004 |
| EP | 2104216 A1 | 9/2009 |
| EP | 2278678 A2 | 1/2011 |
| EP | 2319079 | 5/2011 |
| EP | 2533299 | 12/2012 |
| EP | 2559260 | 2/2013 |
| EP | 2541721 | 8/2013 |
| EP | 2278678 A3 | 12/2013 |
| KR | 10-2011-0067857 | 6/2011 |
| KR | 10-1094055 B1 | 12/2011 |
| KR | 10-2013-0002680 A | 1/2013 |
| KR | 10-1300354 B1 | 8/2013 |
| MX | 2010007636 | 1/2011 |
| TW | 201131938 | 9/2011 |
| WO | WO033058789 | 7/2003 |
| WO | WO2013041737 | 3/2013 |

OTHER PUBLICATIONS

Fronius, Fronius CL 60.0, product information page http://www.fronius.com/cps/rde/xchg/SID-664ED073-2028CBD8/fronius_international/hs.xsl/83_17799_ENG_HTML.htm.

Fronius, Product Animations—Fronius IG Plus/IG Plus V, technology information page http://www.fronius.com/cps/rde/xchg/SID-989B0CFE-610EC19B/fronius_usa/hs.xsl/2714_9081.htm.

Cyboenergy, Central Inverter or String Inverter, technology information page http://www.cyboenergy.com/technologies/invertertechnology.html.

\* cited by examiner

RENEWABLE ENERGY POWER DISTRIBUTION SYSTEM

CROSS-REFERENCE TO RELATED APPLICATIONS

This application takes priority from U.S. Provisional Patent Application No. 61/683,189, filed on Aug. 14, 2012, titled "Source-Sharing Solar/Wind Power System," by inventor Khaliqur Rahman, the contents of which are expressly incorporated herein by this reference.

FIELD OF THE INVENTION

The present invention generally relates to power distribution systems utilizing renewable energy, and, more specifically, power distribution systems that utilize a source-sharing architecture that minimizes energy output degradation in the event of a device or component failure.

BACKGROUND OF THE INVENTION

Electric power systems generally rely on the burning of fossil fuels to meet its electrical power demands, because electrical output from steam and gas turbine generators powered by fossil fuels has been proven to be a reliable and on-demand source of energy. However, due to increasing monetary and environmental costs of the fossil fuels, there has been an increased emphasis in developing cleaner and renewable sources of power and electricity generation Examples of cleaner and renewable sources of energy include solar power, wind power, biomass power, fuel cell power, stored energy, etc. The problem with these sources is that they have not been reliable or on-demand sources for the power grid.

A conventional power distribution system generally comprises one or more renewable energy sources and one or more converters. Each individual renewable energy source is usually connected in series to form a string of renewable energy sources. In large installations, where higher input power is desired, several strings may be interconnected in parallel. The renewable energy sources are also preferably interconnected with the converters to form an overall power distribution system. Thus, when harvesting power from these renewable energy sources, each individual renewable energy source delivers to the converters an electrical voltage, which is converted into a usable form of electricity for the power grid.

Although recent technological advances have resulted in more sophisticated power distribution systems, such systems are generally not equipped to handle a device or component failure of a renewable energy source, such that the energy output is reliably provided to the power grid. For example, power distribution systems are generally designed with single-point failure modes, which may halt the entire operation of the system upon failure to a particular component of the power distribution system or renewable power source. Furthermore, the power distribution system may lack the ability to monitor the performance of the renewable power source or the power distribution system, including such performance criteria as temperature, power, current, and voltage, and the ability to maintain a minimum power output in the event of device or component failure.

Various power distribution systems have attempted to remedy the deficiencies of the currently available power distribution systems. For example, U.S. Pat. No. 8,289,742, issued to Adest et al. ("Adest I"), discloses a power distribution system comprising a plurality of renewable energy sources and a plurality of interconnected converters. The renewable energy sources are interconnected with the converters, and each individual renewable energy source delivers to the converters an electrical voltage, which is converted into a usable form of electricity. Although the power distribution system disclosed in Adest I allows the converters to share a power load with the other converters, these converters do not have ability to accommodate additional power redirected from a failed converter. The Adest I power system also lacks the ability to maintain a minimum power output in the event of component failure.

U.S. Pat. No. 8,384,243, issued to Adest et al. ("Adest II"), also discloses a power distribution system comprising a plurality of renewable energy sources and a plurality of interconnected converters. The Adest II system utilizes a temperature sensor connected to an input of a controller to adjust input power within the system. However, the system disclosed in Adest II is limited to measuring only temperature within the system and similarly lacks the ability to maintain a minimum power output in the event of component failure.

European Patent Application Number EP2533299, also filed by Adest et al. ("Adest III"), discloses a power distribution system comprising a plurality of renewable energy sources and a plurality of interconnected converters. The power distribution system disclosed in Adest III includes modules to monitor multiple parameters of each renewable energy source unit, such as current and voltage. However, like the Adest I and Adest II references, the power distribution system in Adest III does not accommodate an additional power load in the event of a converter failure.

Finally, U.S. Pat. No. 8,138,631, issued to Allen ("Allen"), discloses a power distribution system comprising a plurality of renewable energy sources that are interconnected to a plurality of converters. Allen discloses a communication bus that allows limited monitoring by a third party in the event of component failure. The Allen reference, however, does not disclose a system that can accommodate additional power loading in the event of a converter failure.

Thus, what is needed is a power distribution system that: includes a fault tolerance in the event of component failure; possesses the ability to monitor the performance of the renewable energy sources and converters; and has the ability to offset any reduced energy output resulting from a faulty device or component.

SUMMARY OF THE INVENTION

To minimize the limitations in the prior art, and to minimize other limitations that will become apparent upon reading and understanding the present specification, the present invention discloses a new and useful power distribution system.

One embodiment of the invention is a power distribution system comprising: a plurality of renewable energy sources; and a plurality of converters; wherein each of the plurality of converters is comprised of a plurality of input ports and at least one power conversion module; wherein each of the plurality of input ports are configured to connect to at least one of the plurality of renewable energy sources; wherein each of the plurality of renewable energy sources provides an input power to the plurality of input ports that are connected to the plurality of energy sources; wherein at least one power conversion module is configured to convert the input power from the plurality of renewable energy sources to a converted electrical energy; and wherein the plurality of converters are configured to disconnect from the plurality of renewable energy sources at the plurality of input ports. The input power from the plurality of renewable energy sources may be provided to more than one of the plurality of converters. Each of the plurality of converters may have an excess power capacity, such that the plurality of converters are configured to handle a shifted input power previously destined for another one of the plurality of converters. The plurality of converters may have a fault tolerance, such that, when one or more of the plurality of converters fail, the power distribution system shifts the input power from the one or more failed converters to one or more remaining converters of the plurality of converters in order to maintain the total output power level. The plurality of converters may be configured to disconnect from one or more failed renewable energy sources at the plurality of input ports, when one or more of the plurality of renewable energy sources fail. The one or more failed converters may be configured to disconnect from the plurality of renewable energy sources at the plurality of input ports, when one or more of the plurality of converters fail. The plurality of converters may be configured to monitor one or more parameters of one or more of the plurality of converters and the one or more parameters of one or more of the plurality of renewable energy sources. The one or more parameters may be selected from the group of parameters consisting of but not limited to: a temperature; a power; a current; and a voltage. The power distribution system may further comprise a communication bus; wherein the communication bus may be removeably connected to the plurality of converters; and wherein the communication bus may provide a plurality of data to a local or a remote user, web server or a computer application to monitor and/or control the one or more parameters. The plurality of renewable energy sources may be selected from the group of renewable energy sources consisting of but not limited to: a wind generator; a solar panel array; and solar panel strings and a combination thereof.

Another embodiment of the invention is a power distribution system comprising: a plurality of renewable energy sources; and a plurality of converters; wherein each of the plurality of converters is comprised of a plurality of input ports; wherein each of the plurality of input ports is configured to connect to at least one of the plurality of renewable energy sources, such that each of the plurality of converters is interconnected to all of the plurality of renewable energy sources; wherein each of the plurality of renewable energy sources provides an input power to each of the plurality of input ports of the plurality of converters; wherein the input power of the plurality of renewable energy sources is shared among the plurality of converters; wherein each of the plurality of converters comprises a power conversion module; wherein the power conversion module is configured to convert the input power into an output single or multi-phase AC or DC power; and wherein the output power of each of the plurality of converters is combined to achieve total output power level. Each of the plurality of converters may have an excess power capacity, such that the plurality of converters may be configured to handle a shifted input power previously destined for another one of the plurality of converters. Each of the plurality of converters may have a fault tolerance, such that, when one or more of the plurality of converters fail, the power distribution system may shift the input power from the one or more failed converters to one or more remaining converters of the plurality of converters in order to maintain a minimum output voltage level. The plurality of converters may be configured to disconnect from one or more failed renewable energy sources at the plurality of input ports, when one or more of the plurality of renewable energy sources fail. One or more failed converters may be configured to disconnect from the plurality of renewable energy sources at the plurality of input ports, when one or more of the plurality of converters fail. The plurality of converters may be configured to monitor one or more parameters of one or more of the plurality of converters and the one or more parameters of one or more of the plurality of renewable energy sources. The one or more parameters may be selected from the group of parameters consisting of but not limited to: a temperature; a power; a current; and a voltage. The power distribution system may further comprise a communication bus; wherein the communication bus may be removably connected to the plurality of converters; and wherein the communication bus may provide a plurality of data to a local or a remote user, web server or a computer application to monitor and/or control the one or more parameters. The plurality of renewable energy sources may be selected from the group of renewable energy sources consisting of but not limited to: a wind generator; a solar panel array; and solar panel strings and a combination thereof.

Another embodiment of the present invention is a power distribution system comprising: a plurality of renewable energy sources; a plurality of converters; and an external bus; wherein each of the plurality of converters is comprised of a plurality of input ports; wherein each of the plurality of input ports is configured to connect to at least one of the plurality of renewable energy sources, such that each of the plurality of converters is interconnected to all of the plurality of renewable energy sources; wherein each of the plurality of renewable energy sources provides an input power to each of the plurality of input ports of the plurality of converters; wherein the input power of the plurality of renewable energy sources is shared among the plurality of converters; wherein each of the plurality of converters comprises a power conversion module; wherein the power conversion module is configured to convert the input power into a single or multi-phase AC or DC output power; wherein the output power of each of the plurality of converters is combined to achieve total output power level; wherein each of the plurality of converters has an excess power capacity, such that the plurality of converters are configured to handle a shifted input power previously destined for another one of the plurality of converters; wherein the plurality of converters has a fault tolerance, such that, when one or more of the plurality of converters fail, the power distribution system shifts the input power from the one or more failed converters to one or more remaining converters of the plurality of converters in order to maintain the total output power level; wherein the plurality of converters are configured to disconnect from one or more failed renewable energy sources at the plurality of input ports, when one or more of the plurality of renewable energy sources fail; wherein one or more failed converters are configured to disconnect from the plurality of renewable energy sources at the plurality of input ports, when one or more of the plurality of converters fail; wherein the plurality of converters are configured to monitor one or more parameters of one or more of the plurality of converters and the one or more parameters of one or more of the plurality of renewable energy sources; wherein the communication bus is removably connected to the plurality of converters; wherein the communication bus provides a plurality of data to a local or a remote user, web server or a computer application to monitor and control the one or more parameters; wherein the one or more parameters are selected from the group of parameters consisting of: a temperature; a power; a current; and a voltage; and wherein the plurality of renewable energy sources is selected from the group of renewable energy sources consisting of but not limited to: a wind generator; a solar panel array; and solar panel strings and a combination thereof.

The power distribution system of the present invention may comprise: a plurality of renewable energy sources; a plurality of converters, wherein each converter may comprise a plurality of input ports; one or more controlled power draw modules; a mixer; a power conversion module; and an output port. The renewable energy sources are preferably one or more technologies that utilize replenishable energy sources such as energy from water, wind, the sun, geothermal sources, and biomass sources (e.g., energy crops). Examples of such renewable energy sources may include, without limitation, wind turbines, hydroelectric power stations that utilize hydroelectricity and hydropower, solar panels, solar arrays, cogeneration plants that utilize biomass materials, biofuels, biodiesels, geothermal energy, and the like.

It is an object of the present invention to provide a plurality of converters that combine the input power of one or more renewable energy sources to achieve total output power level.

It is an object of the present invention to provide a power distribution system that minimizes energy output degradation in the event of a device or component failure.

It is a further object of the present invention to provide a power distribution system that has one or more converters, wherein the converters have excess power capacity, such that the power distribution system may shift and store input power from a failed converter to one or more remaining properly functioning converters.

It is a further object of the invention to provide a power distribution system with a fault tolerance, such that, when one of the plurality of converters fail, the remaining converters may maintain the total output power level by shifting the input power obtained from a plurality of renewable energy sources from the failed converter to the remaining, properly functioning converters.

It is a further object of the invention to provide a converter with one or more input ports that are disconnectable from the renewable energy sources in the event of a device or component failure.

It is a further object of the invention to provide a power distribution system that monitors the parameters of the renewable power sources, such as temperature, power, current, and voltage.

It is a further object of the invention to provide a power distribution system that is able to be externally monitored and controlled. The external monitoring preferably monitors and controls the parameters of the renewable power sources or the parameters of the power distribution system.

It is a further object of the invention to provide a power distribution system that generates single or multi-phase AC and/or DC power from a plurality of renewable energy sources.

It is a further object of the invention to overcome the deficiencies of the prior art.

These, as well as other components, steps, features, objects, benefits, and advantages, will now become clear from a review of the following detailed description of illustrative embodiments, of the accompanying drawings, and of the claims.

BRIEF DESCRIPTION OF THE DRAWINGS

The drawings are of illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known procedures and/or components have not been described in detail so as not to unnecessarily obscure aspects of embodiments of the invention.

While some embodiments are disclosed here, still other embodiments of the present invention will become obvious to those skilled in the art as a result of the following detailed description of embodiments of the invention. The invention is capable of modifications of various obvious aspects, all without departing from the spirit and scope of the present invention. The Figures, and their detailed descriptions, are to be regarded as illustrative in nature and not restrictive. Also, the reference or non-reference to a particular embodiment of the invention shall not be interpreted to limit the scope of the invention.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in another embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Definitions

In the following description, certain terminology is used to describe certain features of one or more embodiments of the invention. For example, as used herein, the term "substantially" refers to the complete or nearly complete extent or degree of an action, characteristic, property, state, structure, item, or result. Additionally, the terms "wire" and "cable" are generally used synonymously unless otherwise noted.

As used herein, the term "device", "computer", "electronic data processing unit", "invention server", or "server" generally refers to any device that processes information with an integrated circuit chip, including without limitation, personal computers, mainframe computers, workstations, servers, desktop computers, portable computers, laptop computers, embedded computers, wireless devices including cellular phones, personal digital assistants, tablets, tablet computers, smart phones, portable game players, and hand-held computers. The term "internet" refers to any collection of networks that utilizes standard protocols, whether Ethernet, Token ring, Wifi, asynchronous transfer mode (ATM), Fiber Distributed Data Interface (FDDI), code division multiple access (CDMA), global systems for mobile communications (GSM), long term evolution (LTE), or any combination thereof. The term "communication bus" generally refers to a duplicated, redundant and single or multi-channel multi-point bi-directional data paths for exchange of data between plurality of nodes. Nodes are preferably the exchange point for any transaction of data to/from a module, block or a unit within in or outside the system.

As used herein, the term "renewable energy source" generally refers to one or more technologies that utilize replenishable energy sources such as energy from water, wind, the sun, geothermal sources, and biomass sources such as energy crops. Such renewable energy sources may include without limitation, a wind generator, a solar panel array, solar panel strings, wind turbines, hydroelectric power stations that utilize hydroelectricity and hydropower, solar panels, solar arrays, cogeneration plants that utilize biomass materials, biofuels, biodiesels, geothermal energy, and a combination thereof.

As used herein, the terms "alternating current" and "AC" generally refer to a current where the flow of electric charge periodically reverses direction. The terms "direct current" and "DC" generally refer to a current where electric charge only flows in one direction.

As used herein, the term "independent device" generally refers to any device apart from the power distribution system that does not function with the converters to combine the input power of the one or more renewable energy sources nor achieve or maintain the total output power level of the converters. Preferably, the independent device is configured to provide data information of the power distribution system to local or remote users and may allow a local or remote user to monitor and control one or more parameters of the power distribution system. The device may be any electronic data processing unit such as a web server and may include one or more computer applications.

Figure 1:
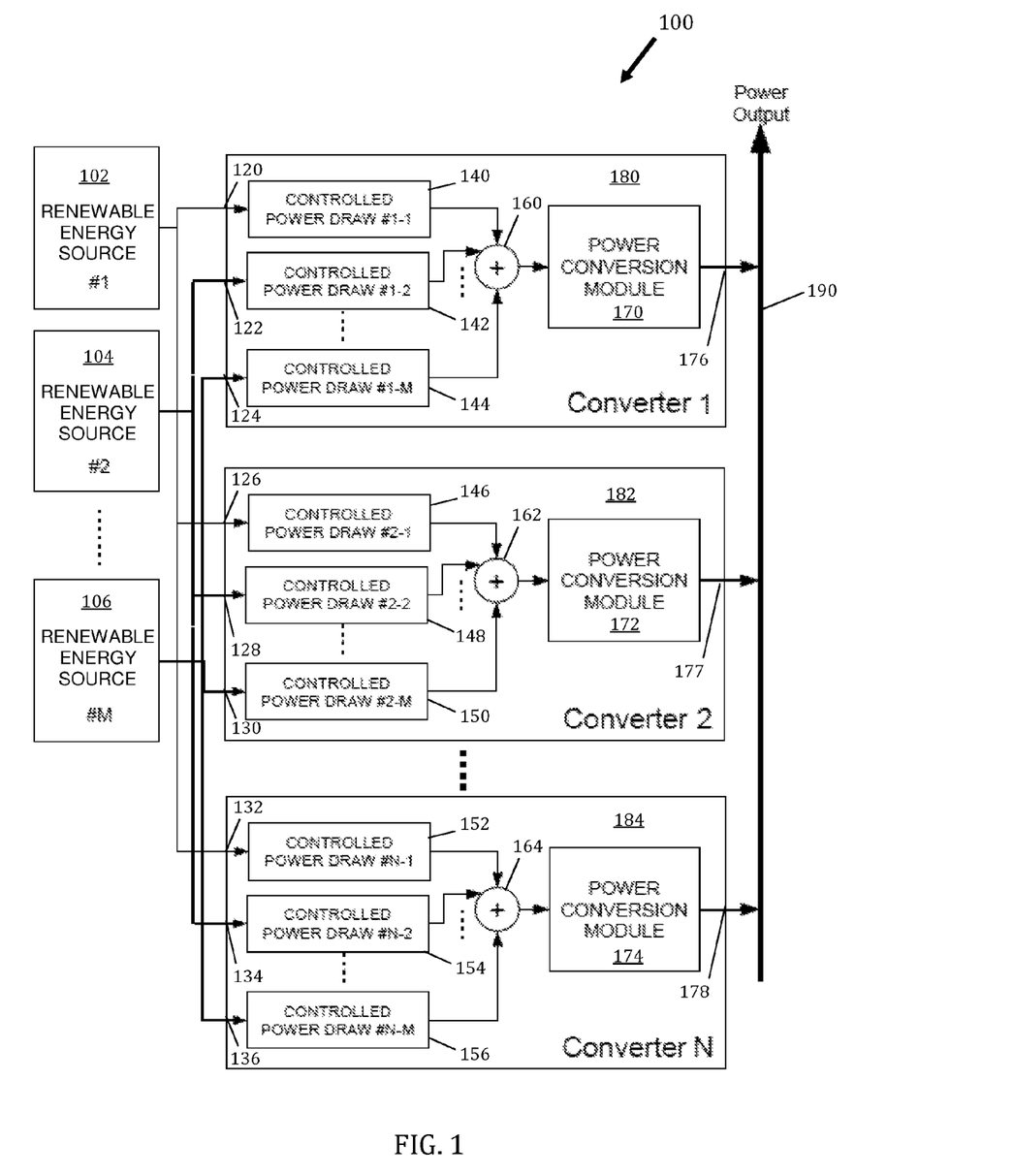
FIG. 1 is a block diagram of one embodiment of the power distribution system.

FIG. 1 is a block diagram of one embodiment of the power distribution system. As shown in FIG. 1, one embodiment of the power distribution system 100 may comprise: a plurality of renewable energy sources 102, 104, 106 and a plurality of converters 180, 182, 184, wherein each converter 180, 182, 184 may comprise a plurality of input ports 120, 122, 124, 126, 128, 130, 132, 134, 136; one or more controlled power draw modules 140, 142, 144, 146, 148, 150, 152, 154, 156; a mixer 160, 162, 164; a power conversion module 170, 172, 174, and an output port 176, 177, 178. The renewable energy sources 102, 104, 106 are preferably one or more technologies that utilize replenishable energy sources such as energy from water, wind, the sun, geothermal sources, and biomass sources (e.g., energy crops). Examples of such renewable energy sources 102, 104, 106 may include, without limitation, wind turbines, hydroelectric power stations that utilize hydroelectricity and hydropower, solar panels, solar arrays, cogeneration plants that utilize biomass materials, biofuels, biodiesels, geothermal energy, and the like. FIG. 1 also shows that converter 184, titled "Converter N" may represent more than one converter.

A converter 180, 182, 184 or power converter is preferably any device that changes the current or voltage from one source of an electrical power and/or may be combined with other components to generate output power in the desired form of DC or AC voltages or currents. AC power can be in the form of a single phase or a multi-phase voltages and/or currents. A converter 180, 182, 184 may be used to convert a varying current or voltage input from a source to a regulated output with a constant level of voltages in the form of AC or DC power. For example, a converter 180, 182, 184 may change the input voltage from 50V to 600V DC input from a renewable energy source to an output voltage of 400V regulated DC. Similarly, a converter may change an input voltage from 400V DC to a 120V single phase AC power or a 24V to 300V variable DC input to a steady 240V three phase AC output. A converter may also combine other input voltages to produce a larger or smaller output voltage.

As discussed above, each converter preferably comprises a plurality of input ports 120, 122, 124, 126, 128, 130, 132, 134, 136; one or more controlled power draw modules 140, 142, 144, 146, 148, 150, 152, 154, 156; a mixer 160, 162, 164; a power conversion module 170, 172, 174, and an output power port 176, 177, 178. The input ports 120, 122, 124, 126, 128, 130, 132, 134, 136 are preferably configured to receive an input power from the renewable energy sources 102, 104, 106. The controlled power draw modules 140, 142, 144, 146, 148, 150, 152, 154, 156 are preferably any component or circuit, which functions as a current regulator that controls the net current flow from its input to its output terminals. Each of the controlled power draw modules 140, 142, 144, 146, 148, 150, 152, 154, 156 is preferably configured to have an excess current capacity to accommodate the input power from the other converters, and this excess current capacity preferably provides an extended tolerance to power failures by shifting an input power from one converter or a controlled draw module to another in the event a converter or component fails. The mixer 160, 162, 164 is preferably any component or circuit used to combine one or more input voltages or currents into a common bus, and the power conversion module 170, 172, 174 is preferably one or more components or circuits used to convert power from one voltage form to another. The output power ports 176, 177, 178 are preferably where the output power is delivered to the grid or designated load via final power output 190.

FIG. 1 shows that the renewable energy sources 102, 104, 106 are preferably interconnected to the input ports 120, 122, 124, 126, 128, 130, 132, 134, 136 of the converters 180, 182, 184 and preferably produce an input power, which is received at the input ports 120, 122, 124, 126, 128, 130, 132, 134, 136 of the converters 180, 182, 184. Each converter 180, 182, 184 is preferably configured to have an excess power capacity to accommodate the input power from the other converters, and this excess power capacity preferably provides an extended tolerance to power failures by shifting an input power from one converter to another in the event a converter or component fails. For example, in one embodiment, a converter configured to take an input power of 1000 watts, which is 50% of its rated power capacity, may accommodate the additional input power of another converter rated with the same amount of power or less. This extra power capacity to take on an additional power input from the renewable energy sources 102, 104, 106 is preferably accomplished by the amount of input power drawn by each controlled power draw module 140, 142, 144, 146, 148, 150, 152, 154, 156. After the input power for each renewable energy source 102, 104, 106 has been drawn by each corresponding controlled power draw module 140, 142, 144, 146, 148, 150, 152, 154, 156, the input power is preferably combined by the mixer 160, 162, 164 and is preferably converted by the power conversion module 170, 172, 174 to its desired output voltage. This desired voltage is usually then sent out through the output power port 176, 177, 178 of each converter 180, 182, 184 and is preferably combined to create a final power output 190.

FIG. 1 also shows that the input ports 120, 122, 124, 126, 128, 130, 132, 134, 136 of each converter 180, 182, 184 may be connected to at least one of the renewable energy sources 102, 104, 106, such that every converter 180, 182, 184 is interconnected to all of the renewable energy sources 102, 104, 106. This configuration preferably creates a fault tolerance, which enables the power distribution system 100 to continue its normal and intended operation, rather than failing, partially or completely, when one or more of the devices or components of the system fails. Specifically, when a converter fails, the other converters preferably redirect the input power of the failed converter to the functioning converters. The functioning converters are preferably configured to carry this larger amount of input power, some of which was intended to be directed to the failed converter. Preferably, each converter 180, 182, 184 is configured to disconnect its input ports 120, 122, 124, 126, 128, 130, 132, 134, 136 from the renewable energy sources 102, 104, 106, and, when an input port is disconnected, the input power derived from that input power is redirected to one or more of the remaining converters and is preferably combined with the other input voltages.

The fault tolerance of the power distribution system allows the system to maintain the total output power level in the event of one or more of the converters failing. The remaining converters may maintain the total output power level by shifting the input power obtained from a plurality of renewable energy sources from the failed converter to the remaining, properly functioning converters.

Figure 3:
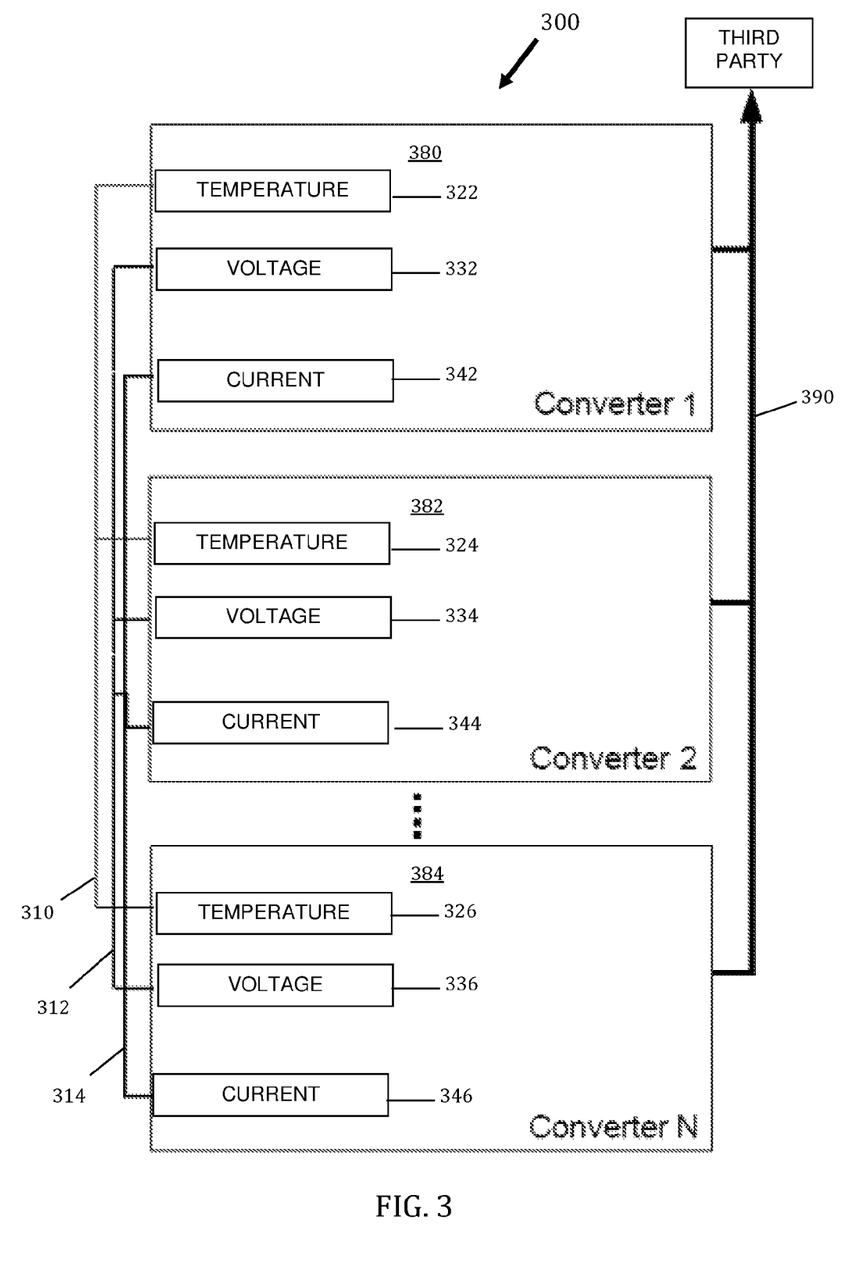
FIG. 3 is a block diagram of another embodiment of the power distribution system and shows the parameters that are monitored among the converters via interconnections.

Furthermore, each converter 180, 182, 184 preferably possesses the ability to internally monitor one or more of the parameters of each renewable energy source 102, 104, 106 or each converter 180, 182, 184 (shown in FIG. 3). After each converter 180, 182, 184 internally monitors its own performance that converter may share the parameter data with the remaining converters. Additionally, one or more converters 180, 182, 184 or renewable energy sources 102, 104, 106 may be externally monitored by a local or a remote user, web server or a computer application via a communication bus. These parameters may include, without limitation, temperature, power, input current, input voltage, and available voltage. Although FIG. 1 shows only three renewable energy sources and three converters, it should be understood that any number of renewable energy sources and converters may be used without deviating from the scope of the invention.

Figure 2:
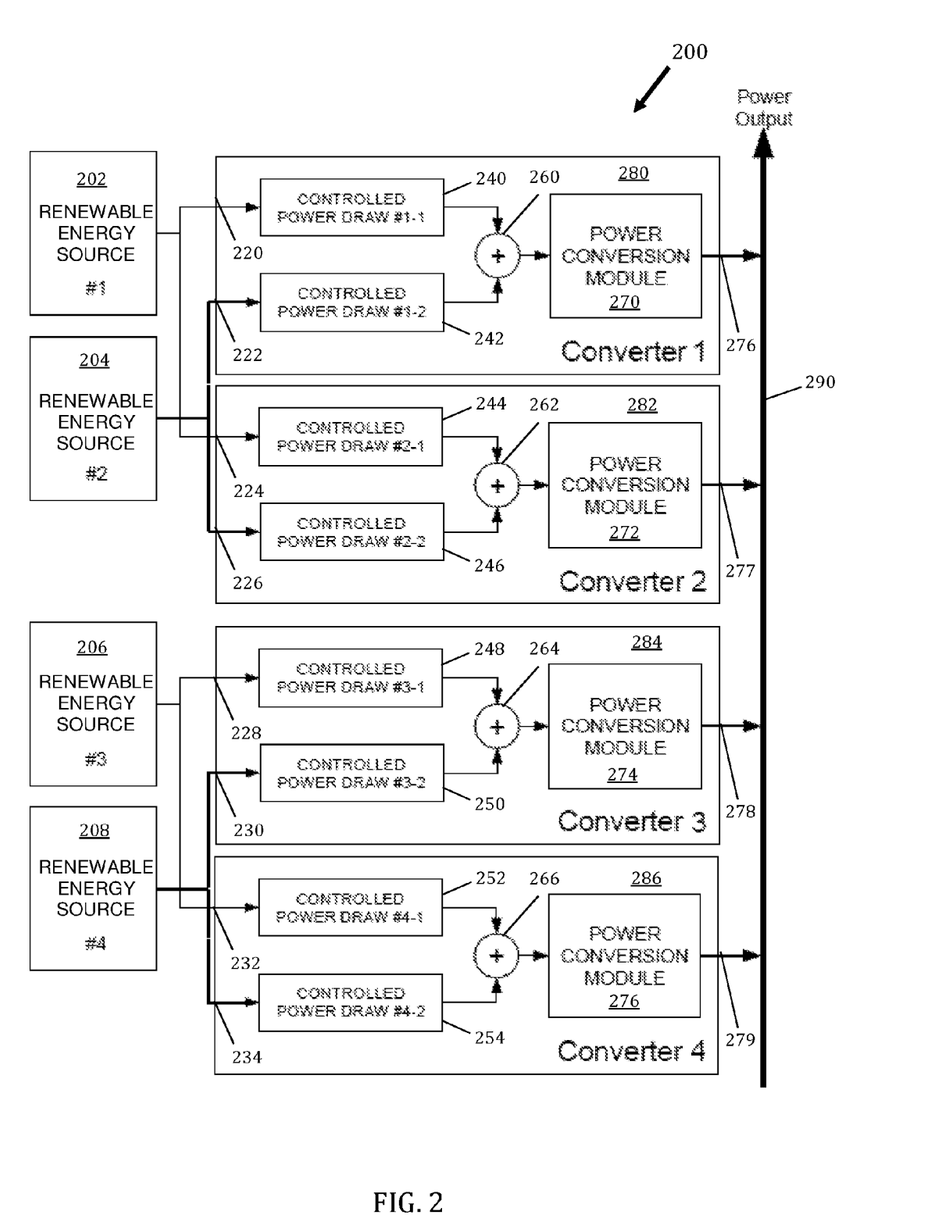
FIG. 2 is a block diagram of another embodiment of the power distribution system and shows the power distribution system comprising multiple power distribution systems.

FIG. 2 is a block diagram of another embodiment of the power distribution system and shows the power distribution system comprising multiple power distribution systems. As shown in FIG. 2, another embodiment of the power distribution system 200 may comprise: a first renewable energy source 202, second renewable energy source 204, third renewable energy source 206, fourth renewable energy source 208, first converter 280, second converter 282, third converter 284, and fourth converter 286. Preferably, each converter 280, 282, 284, 286 may comprise: a plurality of input ports 220, 222, 224, 226, 228, 230, 232, 234; one or more controlled power draw modules 240, 242, 244, 246, 248, 250, 252, 254; a mixer 260, 262, 264, 266; a power conversion module 270, 272, 274, 276; and an output port 276, 277, 278, 279. FIG. 2 shows that, rather than having all of the renewable energy sources 202, 204, 206, 208 interconnected with the input ports 220, 222, 224, 226, 228, 230, 232, 234, the renewable energy sources 202, 204, 206, 208 and converters 280, 282, 284, 286 may be broken up into groups. For example, as shown in FIG. 2, the first renewable energy source 202 and second renewable energy source 204 may be interconnected with the input ports 220, 222, 224, 226 of the first converter 280 and second converter 282 as one power distribution system or group. Similarly, the third renewable energy source 206 and fourth renewable energy source 208 may be interconnected with the input ports 228, 230, 232, 234, the third converter 284, and fourth converter 286 as a second power distribution system or group. Thus, this configuration shows that multiple power distributions systems may be interconnected to produce a single power output 290. Although FIG. 2 shows only two power distribution systems, each with two renewable energy sources and two converters, it should be understood that any number of power distribution systems, renewable energy sources, and converters may be used without deviating from the scope of the invention.

FIG. 3 is a block diagram of another embodiment of the power distribution system and shows the parameters that are monitored among the converters via interconnections. As shown in FIG. 3, another embodiment of the power distribution system 300 may comprise: a plurality of converters 380, 382, 384; a plurality of interconnections 310, 312, 314; and a communication bus 390. As discussed above, the converters 380, 382, 384 are preferably configured to monitor one or more parameters internally and/or externally. Specifically, each converter is preferably configured to monitor temperature 322, 324, 326; voltage 332, 334, 336; and current 342, 344, 346. This may be accomplished through sensors built-in into each converter via one or more interconnections 310, 312, 314. Further, the interconnections 310, 312, 314 may be physical wires or cables, or a wireless system such as Bluetooth or Wi-Fi. Like the interconnections 310, 312, 314, a communication bus 390 preferably allows a local or a remote user, web server or a computer application to externally monitor the parameters via a computer or electronic data processing unit. This will preferably allow a third party to be able to quickly find a faulty device or component.

Figure 4:
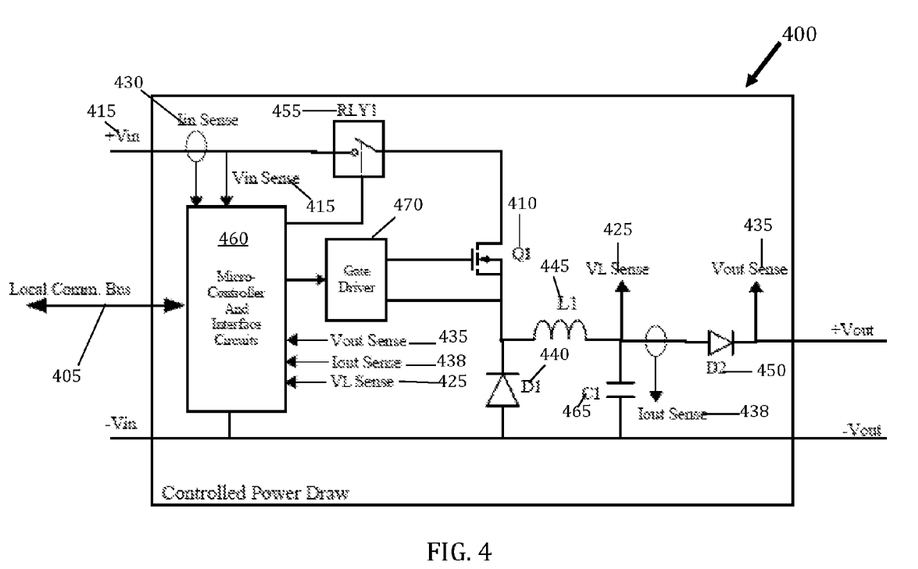
FIG. 4 is a schematic of one embodiment of the controlled power draw module.

FIG. 4 is a schematic of one embodiment of the controlled power draw module. As shown in FIG. 4, one embodiment of the controlled power draw module 400 may include: a local communication bus 405; transistor 410; input voltage 415; inductor voltage 425; input current 430; voltage output 435; output current 438; a first diode 440; inductor 445; second diode 450; microcontroller 460; relay 455; capacitor 465; and gate driver 470. As discussed above, the controlled power draw module 400 is preferably a circuit or component, which functions as a current regulator that controls the net current flow from its input to its output terminals. The controlled power draw module 400 is preferably commanded by the power conversion module 170, 172, 174, 270, 272, 274, 276, 500 (shown in detail in FIG. 5) via a supervisory controller 525 (shown in FIG. 5). A single power conversion module 170, 172, 174, 270, 272, 274, 276, 500 may also control multiple controlled power draw modules within a converter without deviating from the scope of the invention.

In particular, the power conversion module 170, 172, 174, 270, 272, 274, 276, 500 preferably sends commands to the microcontroller 460 of the controlled power draw module 400 via a local communication bus 405. In response, the microcontroller 460 generates a pulse width control signal or stream of control pulses that effectively controls the regulated current flow of the controlled power draw module 400. The pulse width control signal is preferably generated by the microcontroller 460 based on regulation algorithms, and the microcontroller 460 preferably performs the current regulation via pulse width modulator by controlling a switching circuit in the controlled power draw module 400. In one embodiment, as shown in FIG. 4, the switching circuit may comprise a transistor 410 Q1, first diode 440 D1, inductor 445 L1, and capacitor 465 C1. The pulse width modulator signal controls the switching function of the circuit by controlling the input gate signal of transistor 410 Q1 and may also be further driven by a gate driver 470 to increase its signal generated by the microcontroller 460.

The controlled power draw module 400 may also include a second diode 450 D2, which generally provides dual functions. First, it preferably provides a summing point at the output terminal to combine outputs from all local controlled power draw modules without any extra components. Second, the second diode 450 D2 also preferably provides isolation to prevent reverse current flow back into the controlled power draw module 400.

Regarding the microcontroller 460, various embodiments of a microcontroller may include a modern processor chip such as ARM Cotex-M4 chip, which has a built-in floating point processor, or an ARM Cortex-M4 chip from ST microelectronics. In one embodiment, the microcontroller 460 may be an ARM Cortex-M4 chip due to its built-in on-board peripheral circuits such as analog-to-digital converters, pulse-width modulators, and timers. The ARM Cortex-M4 chip also generally includes a direct memory access module, which may further relieve the control processing unit from peripheral servicing overheads, thereby leaving much needed resources for actual computations and high level controls and functions.

As discussed above, multiple controlled power draw modules within a converter module may be controlled by a single power conversion module 170, 172, 174, 270, 272, 274, 276, 500. This is preferably accomplished through the use of a local communication bus 405, which preferably extends across the power conversion module 170, 172, 174, 270, 272, 274, 276, 500 locally without extending further to other power conversion modules. Additionally, communication between the power conversion module 170, 172, 174, 270, 272, 274, 276, 500 and components outside the power distribution system 100, 200, 300 may take place through the system communication bus 805 (shown in FIG. 8), which is separately available at the supervisory controller 525 located within the power conversion module 170, 172, 174, 270, 272, 274, 276, 500.

When monitoring its performance, the microcontroller 460 may send out status signals to the power conversion module 170, 172, 174, 270, 272, 274, 276, 500. Specifically, the microcontroller 460 may send actual values of observed analog variables and suspected fault conditions such as major and minor faults to the power conversion module 170, 172, 174, 270, 272, 274, 276, 500 via the local communication bus 405. Such major faults are generally those faults that require shutdown of the controlled power draw module. Minor faults, on the other hand, are generally those faults that require some attention to prevent a major fault from occurring (e.g., rising temperatures or significant efficiency loss).

In a preferred embodiment, the controlled power draw module 400 can implement two modes of current regulation. Specifically, one mode of current regulation may use a dominant feed forward control with discontinuous conduction mode. The second mode of current regulation may use a feedback current controlled loop with continuous conduction mode. The first mode of current regulation, which utilizes the feed forward control, is generally preferred in situations where a computation is made periodically to calculate the pulse width control timing of the transistor 410 Q1 based on the commanded current value $I_{cmd}$. The calculated pulse width control timing generally results from the input voltages and currents such as positive input voltage 415 $V_{in}$, inductor voltage 425 $V_L$, input current 430 $I_{in}$, output current 438 $I_{out}$ and voltage output 435 $V_{out}$. The feed forward control mode may also take into account a temperature value in the vicinity of the power stressed components such as transistor 410 Q1, first diode 440 D1, inductor 445 L1 and second diode 450 D2. A secondary current control loop may also be implemented to control alongside the feed-forward control to correct small deviations caused by tolerances and temperature.

With the feed-forward control mode, in approximately every few microseconds, a computation may be made resulting from equations of a system model which closely matches the actual hardware circuit of the controlled power draw module 400. These equations generally govern the behavior of the circuit with the given values of voltages and currents around the controlled power draw module 400. The resultant value of the pulse width modulator control value may be used in conjunction with the secondary control loop to achieve fast and accurate response to the perturbations that happen during the course of the system life under different operating conditions.

FIG. 4 also shows how the controlled power draw module 400 may disconnect input ports or itself from the renewable energy source. Specifically, normally open relay 455 preferably enables the controlled power draw module 400 to disconnect itself from a renewable energy source, thereby protecting system against internal failure inside the controlled power draw module 400 or power conversion module 500.

Figure 5:
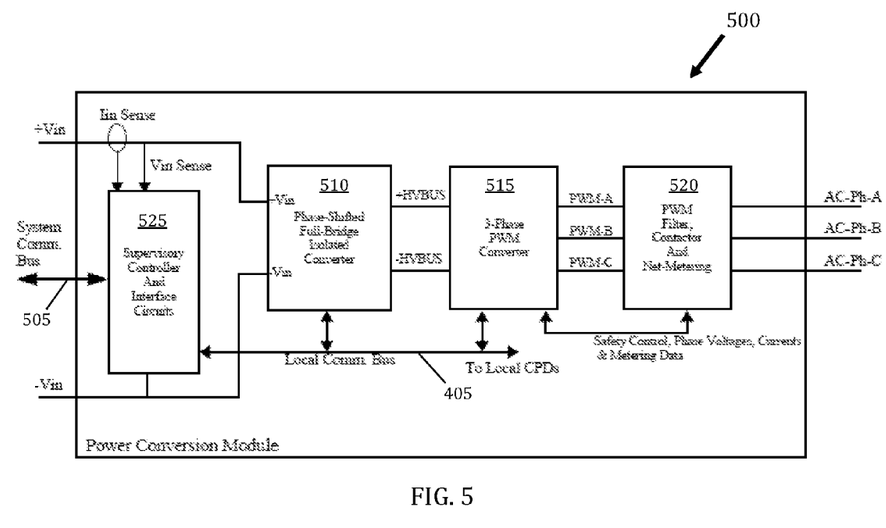
FIG. 5 is a schematic of one embodiment of the power conversion module.

FIG. 5 is a schematic of one embodiment of the power conversion module. As shown in FIG. 5, one embodiment of the power conversion module 500 may include: a local communication bus 405; the supervisory controller 525; and three major modules—i.e., a phase shifted isolated full bridge converter 510, three-phase pulse-width modulator converter 515, and pulse-width modulator filter, contactor & net-metering module 520. The phase shifted isolated full bridge converter 510, three-phase pulse-width modulator converter 515, and pulse-width modulator filter, contactor & net-metering module 520 generally work together under direct control of the supervisory controller 525, even though the isolated full bridge converter 510 and three-phase pulse-width modulator converter 515 may have their own microcontrollers for internal functionality.

The phase shifted isolated full bridge converter 510 is generally built on a phase-shifted topology with zero-voltage switch modes to enhance efficiency and reliability. The primary function of the phase shifted isolated full bridge converter 510 is preferably to provide galvanic isolation between the three-phase alternating current output circuitry and renewable energy source tied circuitry. The phase shifted isolated full bridge converter 510 also may generate an appropriate high voltage bus to power the three-phase converter. The phase shifted isolated full bridge converter 510 preferably has its own local microcontroller to implement switching topology and generally generates high voltage direct current Bus (HVBUS) as commanded by the supervisory controller 525. Furthermore, the phase shifted isolated full bridge converter 510 may also report back full status of its operation to the supervisory controller 525 via the local communication bus 505.

The three-phase pulse-width modulator converter 515 preferably generates a three-phase alternating current modulation in the form of pulse width modulated outputs converted from the HVBUS. The three-phase pulse-width modulator converter 515 preferably also has its own microcontroller and, like the phase shifted isolated full bridge converter 510, the three-phase pulse-width modulator converter 515 generally functions as commanded by the supervisory controller 525. For proper connection to the power grid, the three-phase pulse-width modulator converter 515 generally monitors the three-phase line voltages and currents in real time and preferably locks in the desired frequency, phase and amplitude accordingly, so that a controlled amount of power is transferred to the power grid.

Three-phase pulse-width modulator converter 515 also preferably performs a net-metering via the dedicated circuitry located inside the pulse-width modulator filter, contactor & net-metering module 520. Alternatively, net-metering may be implemented as a software function inside the dedicated microcontroller of the three-phase pulse-width modulator converter 515. Because net-metering chips generally have multiple built-in analog-to-digital converters to measure the three-phase voltages and currents, alongside the net-metering functions, utilizing a net-metering chip is generally more cost effective due to its built-in functions, rather than, implementing complexity hardware for the analog front-end. Furthermore, safety is generally ensured by proper control of contactors installed as part of the output section of the pulse-width modulator filter, contactor & net-metering module 520. One important aspect of three-phase pulse-width modulator converter 515 is generally its complete galvanic isolation of all electrical signals to and from other sections of the power distribution system, such as the isolation of connections to the local communication bus 505 and isolation for direct current power supply for operating its own microcontroller and associated interfaces. Like other parts of the power distribution system 100, 200, 300, the pulse-width modulator converter 515 may report a complete status along with net-metering data to the supervisory controller 525.

The output of the pulse width modulator is generally fed into the pulse-width modulator filter, contactor & net-metering module 520 to remove a modulation carrier and to generate a clean sinewave alternating current output power to the grid terminals via the contactor circuit Together with the net-metering circuits, the overall power conversion module 500 generally achieves controlled transfer of alternating current power to the power grid.

Regarding situations of a malfunction or a failure, the contactors may disconnect and isolate the power grid from the power conversion module 500. The contactors may also allow the power conversion module 500 to synchronize itself to the power grid before applying alternating current power onto the grid. The contactors are controlled by the microcontroller located in the three-phase pulse-width modulator converter 515.

Turning to the supervisory controller 525, the supervisory controller 525 preferably has a powerful set of resources at its disposal including a fast microcontroller (e.g., ARM Cortex-M4) with a large amount flash memory, random access memory, and multiple channels of various types of communication peripherals. The supervisory controller 525 also preferably carries an extensive set of other hardware peripherals such as timers, analog-to-digital converters, and direct memory access.

In a preferred embodiment, the supervisory controller 525 performs a vital function, which is implementing a source sharing principal of the power distribution system 100, 200, 300. The supervisory controller 525 preferably has two major operations. First, the supervisory controller 525 preferably controls multiple controlled power draw modules that are local to the converter in order to feed the local power conversion module. Second, the supervisory controller 525 preferably interacts with other converters of the power distribution system 100, 200, 300 to ensure maximum power generation with optimum utility of available power from the renewable energy sources via effective sharing among available controlled power draw modules and power conversion modules located in each individual converter. Each supervisory controller 525 in the power distribution system 100, 200, 300 is preferably aware of the overall system status and generally works under the concept of collective intelligence—that is, all supervisory controllers work collectively to strengthen system reliability and performance by being aware of the whole system and acting in harmony as if it was one operating environment. There is preferably a dedicated and duplicated system communication bus 805 (shown in FIG. 8) across all supervisory controllers in the power distribution system 100, 200, 300 to ensure maximum reliability and performance.

In various embodiments, one primary aspect of the design of the power distribution system 100, 200, 300 is the distribution of each renewable energy output across multiple converters. That way not only a uniform distribution of available power is achieved across these converters, but also, the design of the power distribution system 100, 200, 300 provides each supervisory controller 525 with an ability to linearly adjust its own share of power generation, thereby improving reliability against long term failures, which mostly occur due to continuous stress factors appearing on different system components. This principal is in sharp contrast with conventional power distribution systems, which work on the basis of switching in and out individual backup or redundant modules in case of a failure. Each individual converter can partially or entirely relieve itself from its power share temporarily depending on the underlying cause or a problem. Additionally, the converters are preferably configured to perform this for routine maintenance purposes while still generating full power by allowing the remaining converters to take a larger share of available energy from the renewable energy sources. To implement the source sharing principal, software functions in the supervisory controller 525 in the example embodiment are executed under a multitasking environment, wherein multiple tasks are running concurrently.

Figure 6:
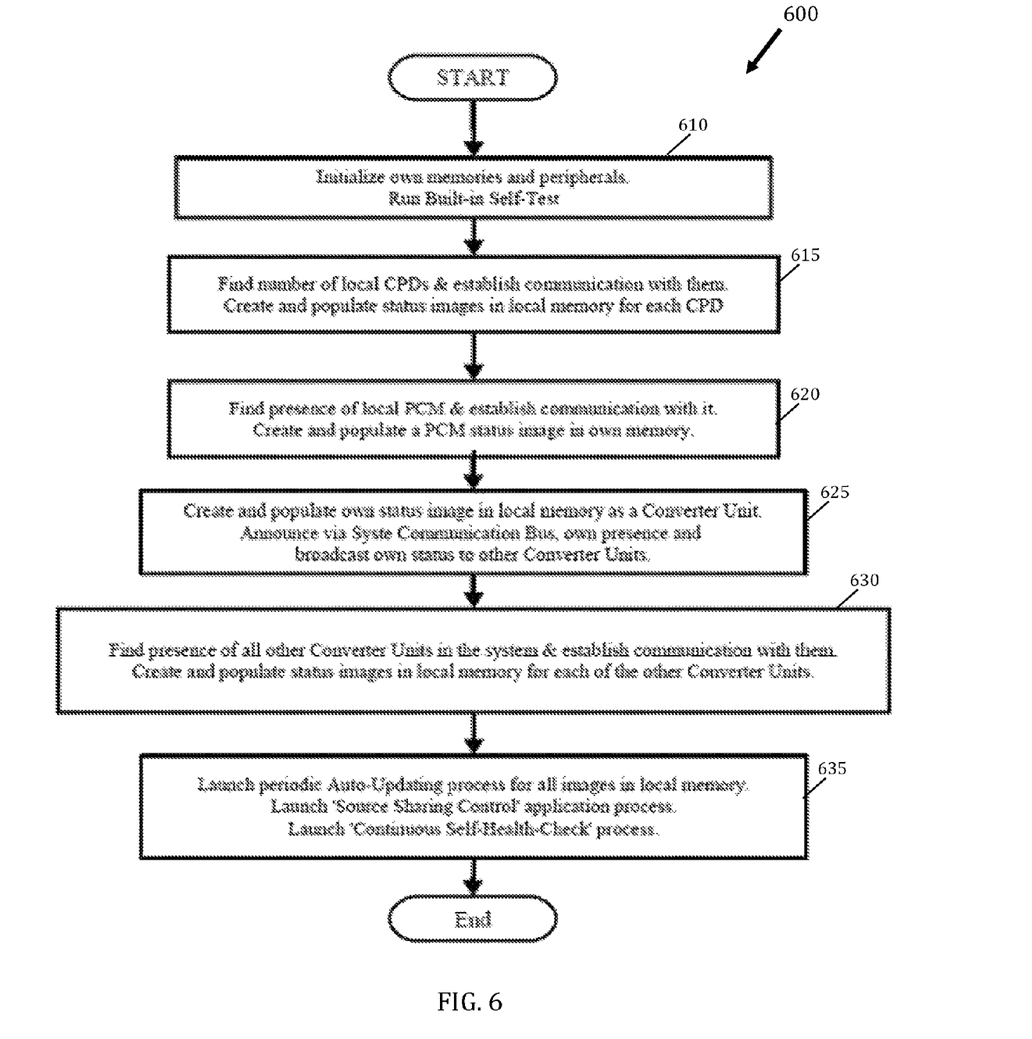
FIG. 6 is a simplified flow chart of one embodiment of the startup for the supervisory controller.

FIG. 6 is a simplified flow chart of one embodiment of the startup for the supervisory controller. As shown in FIG. 6, one embodiment of process startup for the supervisory controller 600 may comprise the steps of: initializing the power distribution system memories and peripherals 610; finding all of local controlled power draw modules and establishing a communication with those local controlled power draw modules 615; finding the presence of a local power conversion module and establish a communication with the local power conversion module 620; creating and populating own status image in the local memory as a converter unit 625; finding the presence of all the remaining converters in the power distribution system and establishing communication with those remaining converters 630; and launching a periodic auto-updating process for all images in the local memory 635. Specifically, the supervisory controller 525 may initially startup the power distribution system memories and peripherals 610. This is generally supplemented by running a built-in self-test within the power distribution system 100, 200, 300. The supervisory controller 525 then preferably finds all of local controlled power draw modules and establishes a communication with those local controlled power draw modules 615. This step may include the process of creating and populating status images in the local memory for each controlled power draw module. After communication is established with the local controlled power draw modules, the supervisory controller 525 locates the presence of a local power conversion module and establishes a communication with the local power conversion module 620. Like the previous step, this step may include the process of creating and populating a power conversion module status image in its own memory. The supervisory controller 525 then creates and populates own status image in the local memory as a converter unit 625. This may require the supervisory controller 525 to announce via the system communication bus 805 (shown in FIG. 8) its own presence and broadcast its own status to the other converters. Next, the supervisory controller 525 finds the presence of the remaining converters in the power distribution system and establishes communication with those remaining converters 630. The supervisory controller 525 may then create and populate status images in the local memory for each of the converters. Once the supervisory controller 525 launches a periodic auto-updating process for all the images in the local memory 635, the supervisory controller 525 may also launch the source sharing control application process and a continuous self-health check process. Although FIG. 6 shows six steps, it should be understood that additional steps may be included without deviating from the scope of the invention.

Figure 7:
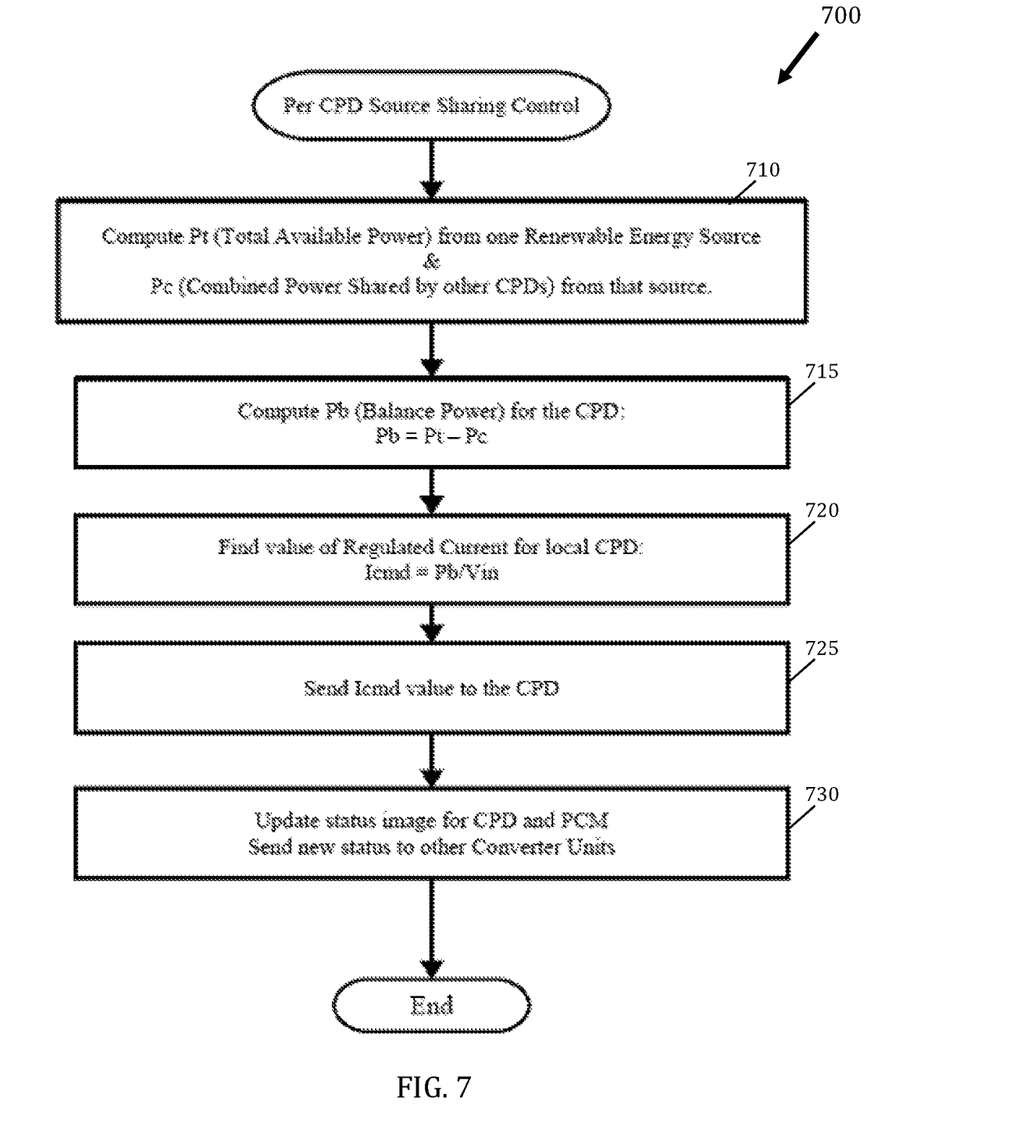
FIG. 7 is a flow chart of one embodiment of simplified source sharing control of one controlled power draw module.

FIG. 7 is a flow chart of one embodiment of the process for simplifying source sharing control of a single controlled power draw module. As shown in FIG. 7, one embodiment of the process for simplifying source sharing control of a single controlled power draw module 700 may comprise the steps of: computing the total available power from one renewable energy source and the combined power shared by the other controlled power draw modules 710; computing the balanced power for that particular controlled power draw module 715; computing the value of the regulated current for the local controlled power draw 720; sending the regulated current value to the controlled power draw module 725; and updating the status image for the controlled power draw module and power conversion module by sending the new status to the other converters 730. Specifically, regarding the step of computing the total available power from one renewable energy source and the combined power shared by the other controlled power draw modules 710, the power distribution system 100, 200, 300 preferably computes $P_t$, which is the total available power from one renewable energy source. The power distribution system 100, 200, 300 also preferably computes the power shared by the other controlled power draw modules $P_c$ by calculating the combined power shared among the other controlled power draw modules from that particular renewable energy source. Given values $P_t$ and $P_c$, the power distribution system 100, 200, 300 then performs the next step, which is computing the balanced power for that particular controlled power draw module 715. This is generally calculated through the following equation:

$$P_b = P_t - P_c$$

Once the balanced power $P_b$ is calculated, the power distribution system 100, 200, 300 generally performs the next step, which is computing the value of the regulated current for the local controlled power draw 720. The value of the regulated current $I_{cmd}$ can be calculated with the following equation:

$$I_{cmd} = P_b / V_{in}$$

The $I_{cmd}$ value is then sent to that controlled power draw module (i.e., sending the regulated current value to the controlled power draw module 725), and the power distribution system 100, 200, 300 preferably updates the status image for the controlled power draw module and power conversion module. Further, this status image is also sent to the other converters—i.e., updating the status image for the controlled power draw module and power conversion module by sending the new status to the other converters 730. Although FIG. 6 shows five steps, it should be understood that additional steps may be included without deviating from the scope of the invention.

Figure 8:
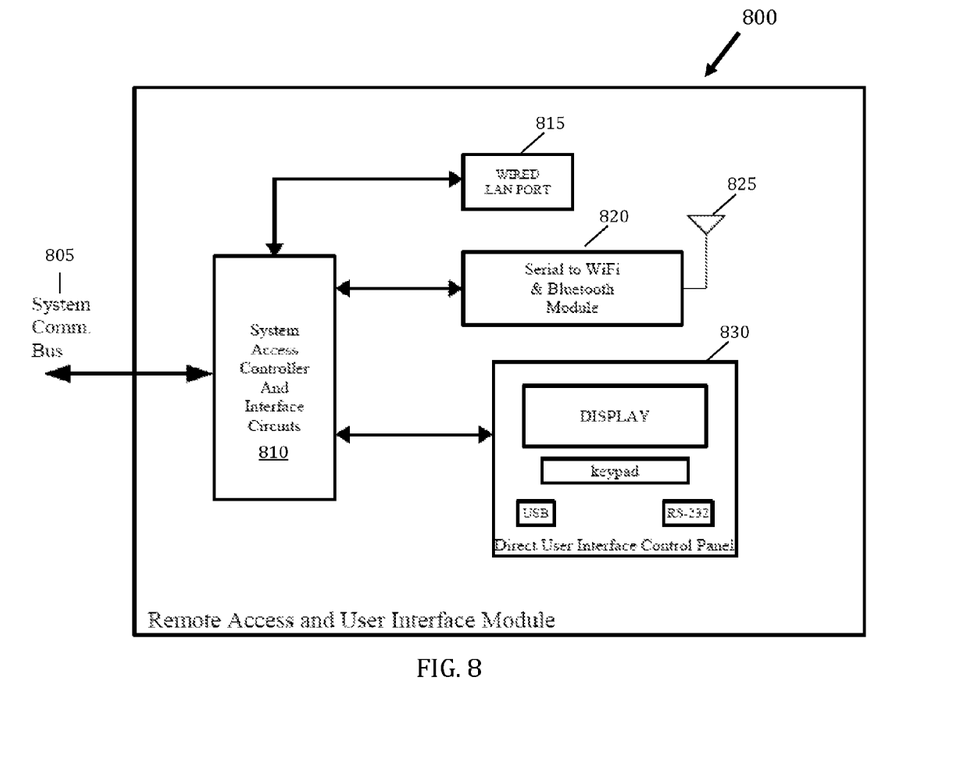
FIG. 8 is a block diagram of one embodiment of the remote access and user interface module for the power distribution system.

FIG. 8 is a block diagram of one embodiment of the remote access and user interface module for the power distribution system. As shown in FIG. 8, one embodiment of the remote access and user interface module 800 may comprise: a system communication bus 805; system access controller and interface circuits 810; wired local area network port 815; serial to Wi-Fi and Bluetooth module 820; antenna 825; and direct user interface control panel 830. The remote access and user interface module 800 is preferably a gateway between the power distribution system 100, 200, 300 and the local user or third party and is typically designed on a high performance control processing unit with large memory and a strong set of communication ports and hardware peripherals.

In one embodiment, a user may connect to the power distribution system 100, 200, 300 in several ways. First, a user may access the power distribution system 100, 200, 300 through a direct user interface control panel 830, which is preferably an interface with a control panel, display, and keypad. The control panel generally provides one or more local computer wired connection ports through a universal serial bus or RS-232 serial connections, and a dedicated application preferably runs on a user laptop or a personal computer to facilitate advanced interaction with the power distribution system 100, 200, 300.

In another embodiment, a user may also have access to the power distribution system 100, 200, 300 through a wired or wireless network. A user may have wireless access to the power distribution system 100, 200, 300 through a serial to Wi-Fi and Bluetooth module 820 via antenna 825 inside the remote access and user interface module 800. Alternatively, a user can also connect to the power distribution system 100, 200, 300 using a smartphone, laptop, or tablet computer using a Wi-Fi or Bluetooth wireless connection. A remote client or server can also be connected to the power distribution system 100, 200, 300 through a wireless access point via WiFi network (i.e., serial to wifi and Bluetooth module 820) or through the wired local area network port 815. Regarding wired networks, a wired local area network port 815 may be provided for connection to an existing local area network (LAN) if available at the installation site.

Regarding remote access, the power distribution system 100, 200, 300 may also provide a user with remote access through several mechanisms. A user, for instance, may directly login into the power distribution system 100, 200, 300 from a remote location via internet using TCP/IP, UDP, Telenet connection, or some other protocol. Alternatively, a remote host may directly connect to the power distribution system 100, 200, 300 securely in real-time, with a dedicated web server, which continuously records and monitors the system performance and generates web portals for authorized users. Authorized users can also access the status of the power distribution system 100, 200, 300 or connect remotely via any such method and interact with the system as may be needed.

In a preferred embodiment, the remote access and user interface module 800 generally continuously monitors system status and events and sends out respective alarms if needed. The remote access and user interface module 800 preferably facilitates remote diagnostics access to allow maintenance personnel to access information about the system performance and devise any required adjustments to the system parameters. If any problems occur with the power distribution system 100, 200, 300, any maintenance personnel or authorized user preferably locates the problem and performs any troubleshooting or repair, if required.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. The invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope of the invention. It is intended that the scope of the invention not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A power distribution system comprising:
   a plurality of renewable energy sources; and
   a plurality of converters;
   wherein each of said plurality of converters comprises a plurality of input ports and at least one power conversion module;
   wherein each of said plurality of input ports is configured to connect to at least one of said plurality of renewable energy sources;
   wherein each of said plurality of input ports is configured to draw a controlled amount of an input power from at least one of said plurality of renewable energy sources;
   wherein each of said plurality of renewable energy sources provides an input power to said plurality of input ports that are connected to said plurality of energy sources;
   wherein said at least one power conversion module is configured to convert said input power from said plurality of renewable sources to a converted electrical energy;
   wherein said plurality of converters are configured to disconnect from said plurality of renewable energy sources at said plurality of input ports; and
   wherein said plurality of converters are configured to monitor one or more parameters of one or more of said plurality of converters and said one or more parameters of one or more of said plurality of renewable energy sources.

2. The power distribution system of claim 1, wherein said one or more parameters are selected from the group of parameters consisting of: a temperature; a power; a current; and a voltage.

3. The power distribution system of claim 2, further comprising a communication bus;
   wherein said communication bus is removeably connected to said plurality of converters; and
   wherein said communication bus provides a plurality of data to an independent device to monitor and control said one or more parameters.

4. A power distribution system comprising:
   a plurality of renewable energy sources; and
   a plurality of converters;
   wherein each of said plurality of converters comprises a plurality of input ports;
   wherein each of said plurality of input ports is configured to connect to at least one of said plurality of renewable energy sources, such that each of said plurality of converters is interconnected to all of said plurality of renewable energy sources;

wherein each of said plurality of input ports is configured to draw a controlled amount of an input power from at least one of said plurality of renewable energy sources;

wherein each of said plurality of renewable energy sources provides said input power to each of said plurality of input ports of said plurality of converters;

wherein said input power of said plurality of renewable energy sources is shared among said plurality of converters;

wherein each of said plurality of converters comprises a power conversion module;

wherein said power conversion module is configured to convert said input power into an output voltage;

wherein said output voltage of each of said plurality of converters is combined to achieve a total output power level;

wherein each of said plurality of converters has an excess power capacity, such that said plurality of converters are configured to handle a shifted input power previously destined for another one of said plurality of converters;

wherein each of said plurality of converters has a fault tolerance, such that, when one or more of said plurality of converters fail, said power distribution system shifts said input power from said one or more failed converters to one or more remaining converters of said plurality of converters in order to maintain said total output power level; and wherein said plurality of converters are configured to monitor one or more parameters of one or more of said plurality of converters and said one or more parameters of one or more of said plurality of renewable energy sources.

5. The power distribution system of claim 4, wherein said one or more parameters are selected from the group of parameters consisting of: a temperature; a power; a current; and a voltage.

6. The power distribution system of claim 5, further comprising a communication bus;

wherein said communication bus is removeably connected to said plurality of converters; and wherein said communication bus provides a plurality of data to an independent device to monitor and control said one or more parameters.

7. The power distribution system of claim 6, wherein said plurality of renewable energy sources is selected from the group of renewable energy sources consisting of: a wind generator; a solar panel array; solar panel strings; and a combination thereof.

8. A power distribution system comprising:
a plurality of renewable energy sources;
a plurality of converters; and
a communication bus;
wherein each of said plurality of converters is comprised of a plurality of input ports;
wherein each of said plurality of input ports is configured to connect to at least one of said plurality of renewable energy sources, such that each of said plurality of converters is interconnected to all of said plurality of renewable energy sources;

wherein each of said plurality of input ports is configured to draw a controlled amount of an input power from at least one of said plurality of renewable energy sources;

wherein each of said plurality of renewable energy sources provides said input power to each of said plurality of input ports of said plurality of converters;

wherein said input power of said plurality of renewable energy sources is shared among said plurality of converters;

wherein each of said plurality of converters comprises a power conversion module;

wherein said power conversion module is configured to convert said input power into an output voltage;

wherein said output voltage of each of said plurality of converters is combined to achieve a total output power level;

wherein each of said plurality of converters has an excess power capacity, such that said plurality of converters are configured to handle a shifted input power previously destined for another one of said plurality of converters;

wherein said plurality of converters has a fault tolerance, such that, when one or more of said plurality of converters fail, said power distribution system shifts said input power from said one or more failed converters to one or more remaining converters of said plurality of converters in order to maintain said total output power level;

wherein said plurality of converters are configured to disconnect from one or more failed renewable energy sources at said plurality of input ports, when one or more of said plurality of renewable energy sources fail;

wherein one or more failed converters are configured to disconnect from said plurality of renewable energy sources at said plurality of input ports, when one or more of said plurality of converters fail;

wherein said plurality of converters are configured to monitor one or more parameters of one or more of said plurality of converters and said one or more parameters of one or more of said plurality of renewable energy sources;

wherein said communication bus is removably connected to said plurality of converters;

wherein said communication bus provides a plurality of data to an independent device to monitor and control said one or more parameters;

wherein said one or more parameters are selected from the group of parameters consisting of: a temperature; a power; a current; and a voltage; and wherein said plurality of renewable energy sources is selected from the group of renewable energy sources consisting of: a wind generator; a solar panel array; solar panel strings; and a combination thereof.

* * * * *